United States Patent

Lin

[11] Patent Number: 5,213,360
[45] Date of Patent: May 25, 1993

[54] PUSH CAR

[75] Inventor: Chin-Feng Lin, Tainan Hsien, Taiwan

[73] Assignee: Ting Yi Enterprise Co., Ltd., Tainan Hsien, Taiwan

[21] Appl. No.: 899,754

[22] Filed: Jun. 17, 1992

[51] Int. Cl.⁵ ............................................... B62B 3/02
[52] U.S. Cl. ...................................... 280/648; 280/30; 280/643; 280/644; 297/105; 297/118; 297/184
[58] Field of Search ................ 280/30, 648, 649, 643, 280/644, 647, 658; 297/DIG. 4, 105, 129, 184, 29, 118

[56] References Cited

U.S. PATENT DOCUMENTS

| | | | |
|---|---|---|---|
| 2,433,886 | 1/1948 | Bremer | 280/648 |
| 2,519,885 | 8/1950 | Carlson | 297/184 |
| 2,768,692 | 3/1957 | Timpson | 280/648 |
| 3,997,213 | 12/1976 | Smith et al. | 280/30 |
| 4,824,167 | 4/1989 | King | 280/30 |

FOREIGN PATENT DOCUMENTS

| | | | |
|---|---|---|---|
| 2557976 | 6/1977 | Fed. Rep. of Germany | 280/649 |
| 3425205 | 1/1986 | Fed. Rep. of Germany | 297/DIG. 4 |

*Primary Examiner*—Eric D. Culbreth
*Attorney, Agent, or Firm*—Pro-Techtor International

[57] ABSTRACT

A push car including a frame having a lower portion pivotally coupled to a base and including a pair of rear wheels disposed in the lower portion, a rod supported in the upper portion of the frame, a bracket including a lower portion pivotally coupled to the frame and a post formed in the upper portion, and a seat including two sleeves engaged on the rod and the post of the bracket, whereby, the seat is supported in place for carrying a baby.

5 Claims, 4 Drawing Sheets

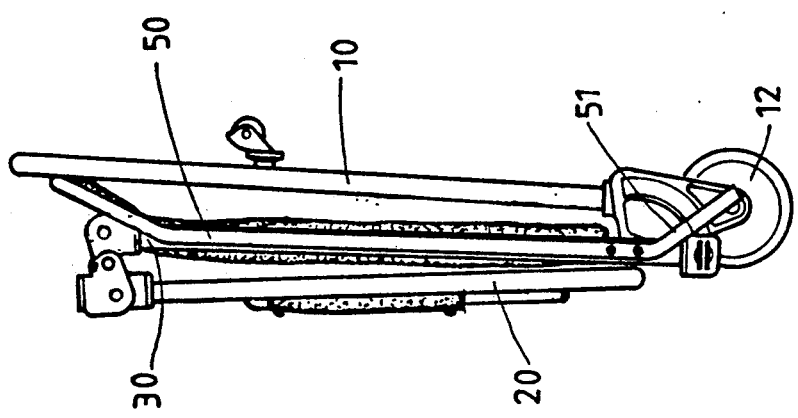

PUSH CAR

BACKGROUND OF THE INVENTION (a) Field of the Invention

The present invention relates to a push car, and more particularly to a push car suitable for carrying both baby and goods.

(b) Description of the Prior Art

Typical strollers are suitable for carrying babies only and are not suitable for carrying goods; and on the contrary, typical barrows are suitable for carrying goods only and are not suitable for carrying babies.

The present invention has arisen to mitigate and/or obviate the afore-described disadvantages of the conventional strollers and barrows.

SUMMARY OF THE INVENTION

The primary objective of the present invention is to provide a push car which is suitable for carrying both babies and goods.

In accordance with one aspect of the present invention, there is provided a push car comprising a base including a pair of front wheels disposed in a front portion thereof, a frame having a lower portion pivotally coupled to a rear portion of the base and including a pair of rear wheels disposed in the lower portion thereof, a rod laterally supported in an upper portion of the frame, a bracket including a post and a pair of arms extended from the post, the pair of arms including a lower portion pivotally coupled to the lower portion of the frame, and a seat support including a first sleeve formed in a rear portion thereof for engagement on the rod of the frame and a second sleeve formed in a front portion thereof for engagement on the post of the bracket, whereby, the seat support is supported in place for carrying a baby.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 5 is a side view of the push car in a folded position; and

DETAILED DESCRIPTION OF THE INVENTION

Figure 1:
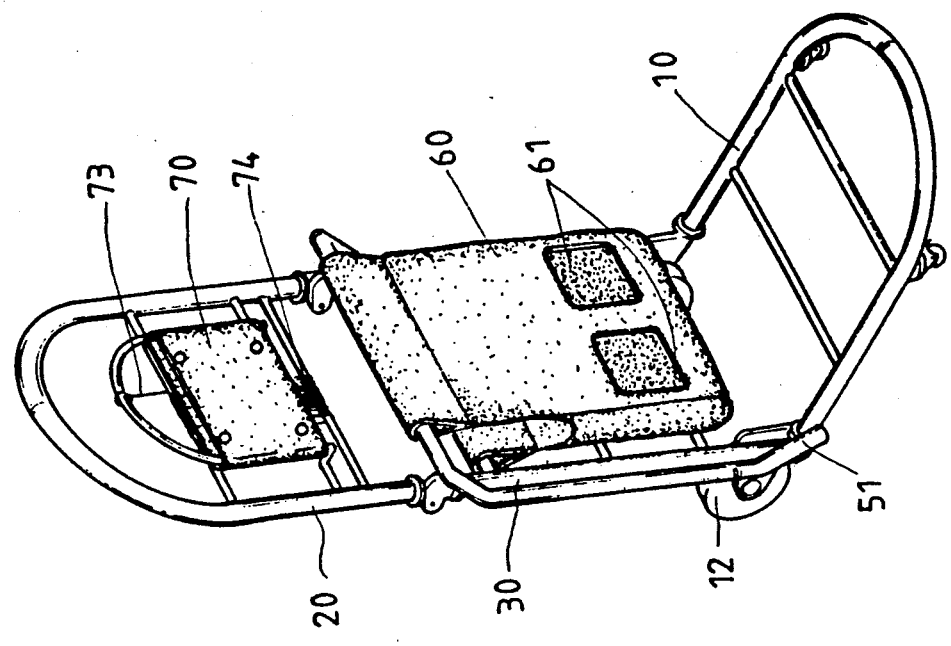
FIG. 1 is a perspective view of a push car in accordance with the present invention.
Figure 2:
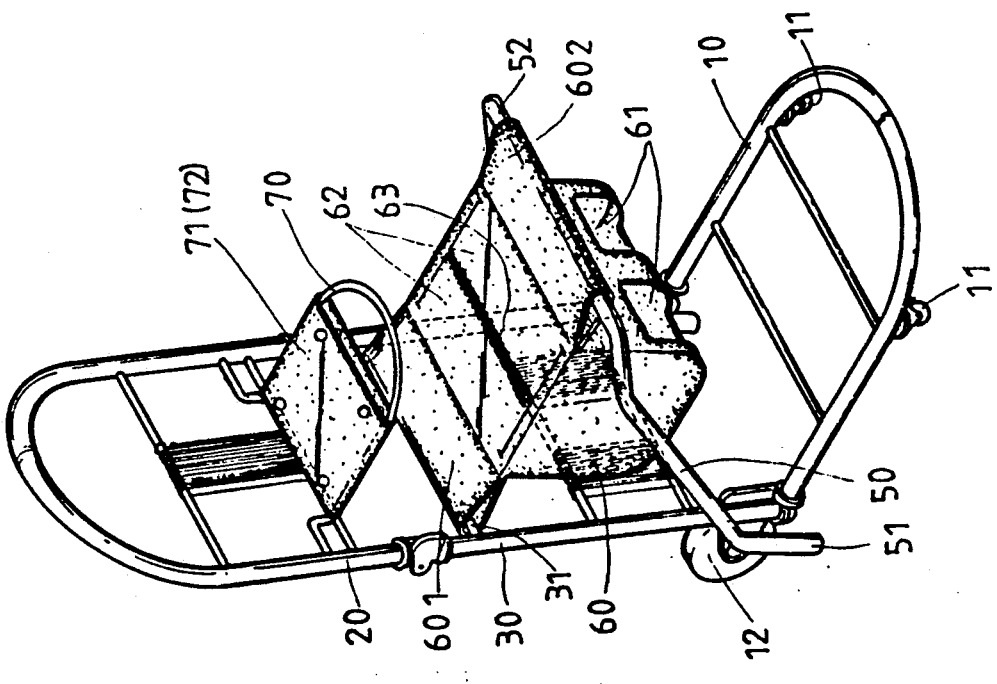
FIG. 2 is a perspective view of the push car in which the seat for carrying baby is folded.

Referring to the drawings and initially to FIGS. 1 and 2, a push car in accordance with the present invention comprises generally a base 10 including a pair of front wheels 11 disposed in a front portion thereof, a frame 30 including a lower portion pivotally coupled to the rear portion of the base 10 and including a pair of rear wheels 12 disposed in the lower portion thereof and a rod 31 laterally disposed in an upper portion thereof, and a handle 20 having a lower portion pivotally coupled to the upper portion of the frame 30.

A bracket is inverted U-shaped including a post 52 having a pair of arms 50 extended therefrom, each of the arms 50 has a lower portion pivotally coupled to the lower portion of the frame 30; a seat support 60 is made of cloth, such as canvas, and includes a sleeve 601 formed in the rear portion for engagement on the rod 31 of the frame 30 and a sleeve 602 formed in the front portion for engagement on the post 52 of the bracket so that the seat support 60 can be supported in place.

The bottom ends 51 of the arms 50 contact the ground when the bracket is opened as shown in FIG. 1, such that the rear wheels 12 are elevated and such that the push car in accordance with the present invention can not be moved when the push car is disposed in a level condition as shown in FIG. 1. However, when the push car is tilted, for example, when the handle 20 is pulled rearward and when the base 10 moves upward, the push car can also be moved by the rear wheels 12 only. As shown in FIG. 2, when the bracket is folded, the wheels 11, 12 contact the ground such that the push car is suitable for carrying goods.

It is to be noted that the arms 50 can also be made shorter such that the lower ends 51 of the arms 50 will not contact the ground and such that the push car can also be moved when the bracket is opened.

Figure 3:
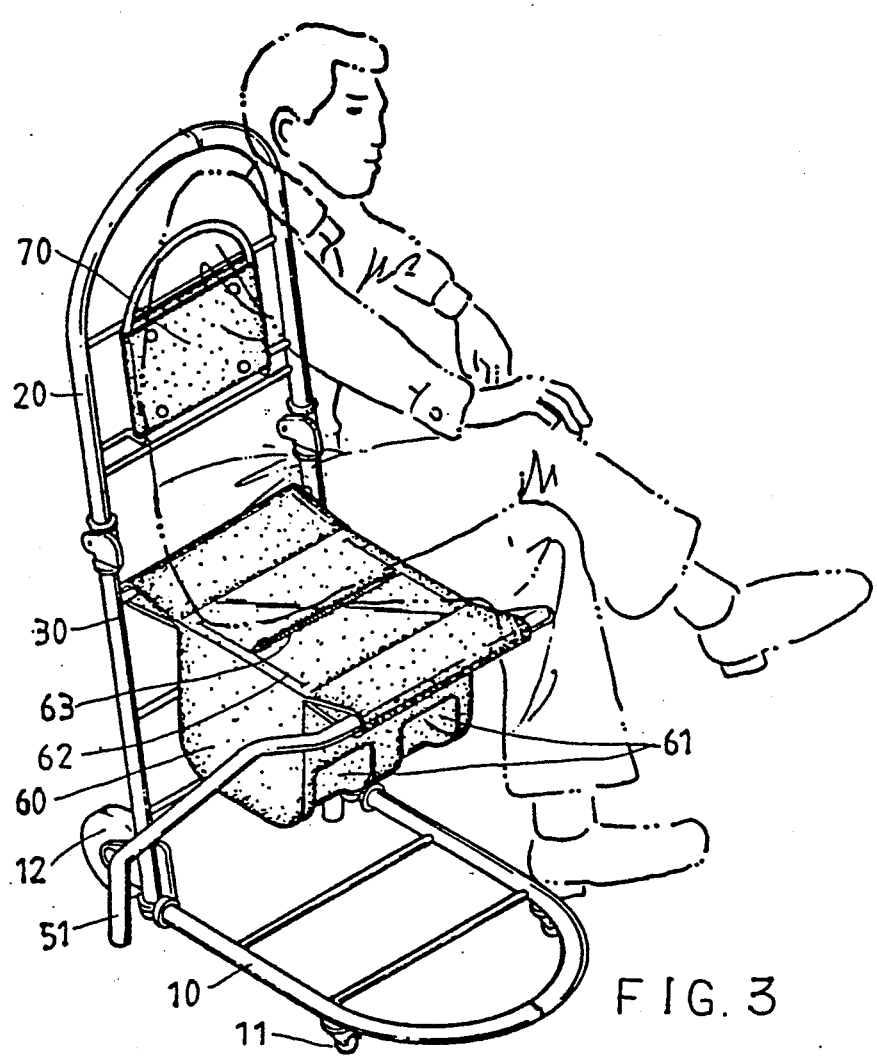
FIGS. 3 and 4 are perspective views illustrating the operations of the push car.

The seat support 60 includes two flaps 62 having an adjacent edge coupled together by an engaging means such as a zipper 63, and having the opposite edges coupled to the sleeves 601, 602 respectively, such that the open upper portion of the seat support 60 can be enclosed by the flaps 62 and such that the user may be seated thereon, best shown in FIG. 3. A baby can be seated in the seat support 60 when the zipper 63 is opened and when the flaps 62 are depended downwards. The seat support 60 includes two openings 61 formed in the front and lower portion thereof for extension of the feet of the baby, best shown in FIG. 4.

Figures 4, 6:
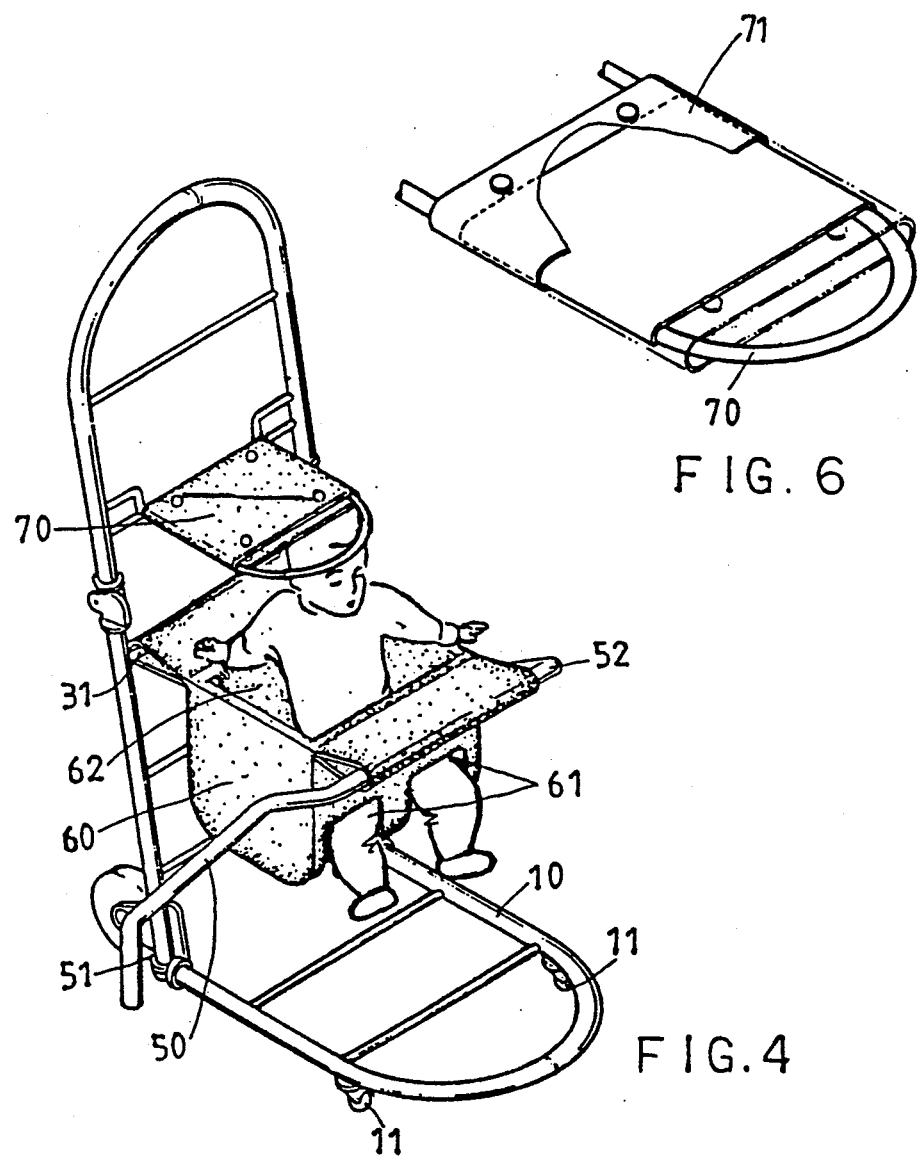
FIG. 6 is a perspective of the shield.

As shown in FIG. 6, a shield 70 is pivotally coupled to the handle 20 and includes a cover 71 disposed thereon for shielding the baby seated in the push car, as shown in FIG. 4. When the cover 71 is disposed in a level condition as shown FIG. 4, the cover 71 can also be used as a table for writing purposes. This is particularly suitable for the travelers to write the documents in the airport.

It is to be noted that the push car can be folded to the position as shown in FIG. 5 in a conventional way and will not be described in further details.

Accordingly, the push car in accordance with the present invention can be used to carry baby and is also suitable for carrying goods.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A push car comprising a base including a pair of front wheels disposed in a front portion thereof, a frame having a lower portion pivotally coupled to a rear portion of said base and including a pair of rear wheels disposed in said lower portion thereof, a rod laterally supported in an upper portion of said frame, a bracket including a post and a pair of arms extended from said post, said pair of arms including a lower portion pivotally coupled to said lower portion of said frame, and a seat support including a first sleeve formed in a rear portion thereof for engagement on said rod of said frame and a second sleeve formed in a front portion thereof for engagement on said post of said bracket, whereby said seat support is supported in place for carrying a baby; and wherein said seat support includes an upper portion, two flaps oppositely disposed in said upper portion and including an adjacent edge coupled together by an engaging means such that said upper portion of said seat support is enclosed by said flaps and such that a seat is formed for supporting a user.

2. A push car according to claim 1, wherein each of said arms of said bracket includes a bottom end contacted with the ground for elevating said rear wheels when said bracket is rotated forward for carrying said baby, whereby, said push car is prevented from movement, and said bottom ends of said arms are elevated when said arms are folded.

3. A push car according to claim 1, wherein said seat support includes an open upper portion, two flaps oppositely disposed in said open upper portion and including an adjacent edge coupled together by an engaging means such that said open upper portion of said seat support is enclosed by said flaps and such that a seat is formed for supporting a user, and a shield is pivotally coupled on said upper portion of said frame for shielding said baby and for forming a table.

4. A push car comprising a base including a pair of front wheels disposed in a front portion thereof, a frame having a lower portion pivotally coupled to a rear portion of said base and including a pair of rear wheels disposed in said lower portion thereof, a rod laterally supported in an upper portion of said frame, a bracket including a post and a pair of arms extended from said post, said pair of arms including a lower portion pivotally coupled to said lower portion of said frame, and a seat support including a first sleeve formed in a rear portion thereof for engagement on said rod of said frame and a second sleeve formed in a front portion thereof for engagement on said post of said bracket, said seat support including an open upper portion, two flaps oppositely disposed in said open upper portion and including an adjacent edge coupled together by an engaging means such that said open upper portion of said seat support is enclosed by said flaps and such that a seat is formed for supporting a user, whereby, said seat support is supported i place for carrying a baby.

5. A push car according to claim 4, wherein each of said arms of said bracket includes a bottom end contacted with ground for elevating said rear wheels when said bracket is rotated forward for carrying said baby, whereby, said push car is prevented from movement, and said bottom ends of said arms are elevated when said arms are folded.

* * * * *